United States Patent [19]

Willetts

[11] 3,856,325

[45] Dec. 24, 1974

[54] MULTIPLE AXLE VEHICLE SUSPENSION SYSTEM

[76] Inventor: Elwood H. Willetts, 102 S. Penataquit Ave., Bay Shore, N.Y. 11706

[22] Filed: Aug. 23, 1973

[21] Appl. No.: 390,931

Related U.S. Application Data

[60] Division of Ser. No. 293,648, Sept. 29, 1972, abandoned, which is a continuation-in-part of Ser. No. 196,982, Nov. 9, 1971.

[52] U.S. Cl. ............ 280/124 R, 267/52, 403/120, 403/225
[51] Int. Cl. ............................................. B60c 5/06
[58] Field of Search .. 280/104.5 A, 104.5 R, 124 R; 267/52

[56] References Cited
UNITED STATES PATENTS

| | | | |
|---|---|---|---|
| 2,191,941 | 2/1940 | Reid | 267/52 |
| 3,103,350 | 9/1963 | Chosy | 267/52 |
| 3,227,468 | 1/1966 | Raidel | 267/52 |
| 3,361,445 | 1/1968 | Harbers | 267/52 |

*Primary Examiner*—Philip Goodman
*Attorney, Agent, or Firm*—Paul J. Sutton

[57] ABSTRACT

The present invention comprises a complete suspension system for multiple axle vehicles, including a single axle suspension structure, a tandem axle suspension structure wherein road and tire excitations of each axle are isolated from the opposing axle and from the sprung mass or vehicle frame, and a third structure interconnecting the tandem axles with articulated load equalizing rocker beams which are separately trunnioned in the suspension structure supported by said tandem axles. Both the single axle and the tandem axle suspension structures employ spherically shaped, pressure resistant, elastomeric spring means formed with cup shaped seats which, in turn, exhibit a varying spring rate upon said elastomeric spring means being subjected to load.

9 Claims, 11 Drawing Figures

MULTIPLE AXLE VEHICLE SUSPENSION SYSTEM

This is a divisional patent application of application Ser. No. 293,648 filed Sept. 29, 1972, now abandoned.

Which is a continuation-in-part patent application of my co-pending application Ser. No. 196,982 filed Nov. 9, 1971, which has been co-pending with my application Ser. No. 123,581, filed Mar. 12, 1971, now U.S. Pat. No. 3,687,478 dated Aug. 29, 1972, and further discloses improvements over the subject matter contained in my U.S. Pat. No. 3,572,745 dated Mar. 30, 1971. U.S. Pat. No. 3,572,745, itself, is a continuation-in-part of application Ser. No. 721,558, filed Apr. 1, 1968, now abandoned, and application Ser. No. 649,502, filed June 28, 1967, now abandoned. The subject matter of my U.S. Pat. Nos. 3,572,745 and 3,687,478 is hereby incorporated by reference into the present disclosure.

My present invention relates generally to suspension structures of the type used with multiple axle bogies of trucks, trailers and railroad cars, and more specifically this invention relates to composite, elastomerically damped suspension structures for both single and tandem axles which exhibit a progressively increasing spring rate under and when subjected to increasing loads.

A great deal of interest has been directed toward suspension structures for use in trucks, trailers, railroad cars and the like because of the stalemate that appears to have come about in efforts to produce a suspension structure which will effectively minimize or eliminate the undesirable conditions commonly known as wheel hop, impact transfer from one axle to another, and other vibrational phenomena tending to produce driver fatigue and uneven riding. Tandem suspension structures currently in use employ means such as an undamped beam affixed to both axles or an undamped beam hingedly interconnecting axle mounted leaf springs. In both of these cases, as an example, the excitations of each axle, which may be produced by road conditions, are transmitted to other respective axles by such undamped means, and in some cases the excitation is amplified in transmission.

Presently known suspension structures include a geometry of construction which produce either no assistance in directional control of the path of a vehicle or a harmful misdirection of control through converging axle structures extending outwardly from, rather than inwardly to, the center of path curvature. Single axle suspension structures for commercial trucks almost universally employ leaf springs with a steering axle, location so close to the extreme front of the vehicle that restricted spring length precludes adequate deflection for a low frequency cab ride; thus chassis vibration occurs with high maintenance costs, while driver comfort depends on seat cushioning.

In one form of this invention comprising a single axle suspension structure, a progressively increasing spring rate accompanies a wheel stroke of higher amplitude than is available with leaf springs.

The progression of my efforts in attempting to effectively isolate road-induced excitations from the driver of vehicles may perhaps best be seen by reviewing certain of my previously issued patents. In my U.S. Pat. No. 3,013,808, we see the concept of isolation of excitations within one axle from a sprung mass as well as from another axle of a tandem bogie. In U.S. Pat. No. 3,171,668 we see my use of a supporting bushing within which a relatively high radial deflection is exhibited, and wherein a tubular elastomer is highly deflected such that it is stressed in torsional shear.

In U.S. Pat. Nos. 3,337,235 and 3,484,118 I disclose embodiments of my inventions wherein a helical torsion spring is utilized to isolate excitations between axles and a sprung mass. U.S. Pat. No. 3,361,442 covers my articulated suspension beam for the support of opposing axles, in applications between the adjacent ends of pairs of leaf springs. The aforedescribed isolation is also accomplished by the structure shown in my U.S. Pat. No. 3,572,745.

The above patents, while non-anticipatory of the present invention, are brought to the reader's attention to show the chronological development of structures which will yield favorable ride characteristics.

Perhaps a brief description of the operating characteristics of vehicle suspensions and their associated load levels will lend an appreciation of this subject matter to the reader. Generally, there are three categories of load levels: empty load level, design load level and bump load level. At empty load level, the weight of the vehicle is the mass on which the vehicle suspension system operates. At design load level, the suspension system operates on the mass of the vehicle plus the mass of the estimated full load of the vehicle. At bump load level, the suspension system operates on the same mass as at design load level mass with an additional static load induced by the design load level mass undergoing a change in direction of travel, as would be induced when, for example, a fully loaded vehicle encounters a sharp turn; or an additional dynamic load induced by encountering a road bump.

Since most vehicles generally operate in the three aforementioned modes, it would be advantageous to provide a suspension system which would cushion the vehicle ride by permitting only low frequency deflections in all three modes. In conventional vehicle suspension systems composed of a pair of rocker beams and a damping member between the vertically extending components of the rocker beams, when a dynamic force is induced on a loaded vehicle axle, i.e., when a bump load level condition occurs, the force is transmitted directly to the damping member which is already compressed by the static load on the vehicle. Since the damping member is usually designed so that it exhibits a high resistance to deflection or spring rate at design load level only, the damping member merely transmits the force back through the rocker beam and induces a resonance condition in the vehicle suspension system. This is unacceptable from the standpoint of vehicle suspension wear and comfort of ride. The same conditions result when a vehicle with a conventional suspension system and a damping member designed to provide a high spring rate at design load level only is in the empty load level mode. When the vehicle encounters a bump, there is virtually no deflection of the damping member resulting in a high frequency deflection ride during this mode of operation.

In order to provide a smooth, low frequency deflection ride during all three modes of operation, my U.S. Pat. No. 3,572,745 describes a suspension system wherein an elastomeric damping member having a cylindrical center section and spherically convex ends is positioned between a pair of spherically cupped discs or seats attached to the vertically extending componenta of a pair of opposing rocker beams. The combination of the concave seats and the spherically shaped elastomeric members provide a vehicle suspension system which exhibits a progressively increasing resistance to deflection, i.e. a progressively increasing spring rate.

A progressively increasing spring rate makes it possible for a suspension system to have a range of spring rates for different load levels. It is thus possible to have a low spring rate at any empty vehicle load level, a higher spring rate at design load level and a still higher spring rate at bump load level.

A suspension system contemplated by one embodiment of this invention includes a vehicle frame which is supported by a bracket depending downwardly from the frame. The bracket is supported by a pair of rocker beams having horizontal and vertical components. The horizontal components of the rocker beam are supported by a pair of laterally extending vehicle axles by any suitable means. In a preferred embodiment, the horizontal components of the rocker beams are supported in resilient trunnion bushings which are carried by hanger brackets supported by the vehicle axles. Cup shaped seats or discs are attached to the vertically extending components of each rocker beam.

To the extent just described, at least one embodiment of the suspension system of this invention is similar to the suspension system described in my U.S. Pat. No. 3,572,745. One improvement of this invention resides in providing either a single elastomer or a plurality of generally spherically shaped elastomers which are arranged in series and compressively restrained between seats. The elastomers may be axially spaced apart from each other by spacers having spherically cupped seats, or may have no spacer whatsoever, as described below. The use of a plurality of spherically shaped elastomeric members, and of the spherically cupped spacers supplements the action of the cupped discs in molding the deflection of the elastomeric members to provide a more efficient progressive increase in the resistive spring rate of the suspended vehicle than was possible with the system described in my U.S. Pat. No. 3,572,745.

Tests conducted on the suspension system disclosed in my U.S. Pat. No. 3,572,745 (System A in the chart below) and the suspension disclosed herein (System B in the chart below) indicate tha the latter system exhibits a progressively increasing spring rate of 1,250 lbs./inch of deflection at 1,000 lbs. and of 50,000 lbs./inch of deflection at 26,000 lbs. The system disclosed in my prior patent exhibits a progressively increasing spring rate of 3,580 lbs./inch of deflection at 1,000 lbs. and of 28,000 lbs./inch of deflection at 26,000. Accordingly, the magnitude and range of the spring rate increases in the present system is far superior to that disclosed in my prior systems, thereby resulting in a low frequency deflection ride in two of the load level modes mentioned above, i.e., empty, design, and a higher spring rate at bump to resist transverse roll.

The actal weight of elastomeric members used in the system disclosed in my prior patents has been approximately 24 lbs. (12 lbs. each). The actual weight of the two pairs of elastomeric members used in my systems has been about 16 lbs. This results in a saving of 8 lbs. of elastomeric material, which is a cost saving of approximately $25.00 or more per vehicle suspension system.

TABLE "A"

| LOAD IN POUNDS | TOTAL DEFL. | INCREASED DEFL. | DEFL. FACTOR | SPRING RATE LBS/INCH DEFL. |
|---|---|---|---|---|
| 1000 | 0.250 | .250 | .555 | 3580 |
| 2000 | 0.555 | .305 | .585 | 3400 |
| 3000 | 0.835 | .280 | .550 | 3620 |
| 4000 | 1.105 | .270 | .530 | 3780 |
| 5000 | 1.365 | .260 | .530 | 3780 |
| 6000 | 1.635 | .270 | .500 | 4000 |
| 7000 | 1.865 | .230 | .440 | 4540 |
| 8000 | 2.015 | .210 | .39 | 5130 |
| 9000 | 2.195 | .180 | .34 | 5900 |
| 10000 | 2.355 | .160 | .30 | 6660 |
| 11000 | 2.495 | .140 | .26 | 7700 |
| 12000 | 2.615 | .120 | .24 | 8350 |
| 13000 | 2.735 | .120 | .23 | 8700 |
| 14000 | 2.845 | .110 | .21 | 9550 |
| 15000 | 2.945 | .100 | .18 | 11100 |
| 16000 | 3.025 | .080 | .16 | 12500 |
| 17000 | 3.105 | .080 | .15 | 13300 |
| 18000 | 3.175 | .070 | .13 | 15400 |
| 19000 | 3.235 | .060 | .11 | 18200 |
| 20000 | 3.285 | .050 | .10 | 20000 |
| 26000 | 3.510 | .035 | .07 | 28600 |

TABLE "B"

| LOAD IN POUNDS | TOTAL DEFL. | INCREASED DEFL. | DEFL. FACTOR | SPRING RATE LBS/INCH DEFL. |
|---|---|---|---|---|
| 1000 | 0.76 | .76 | 1.6 | 1250 |
| 2000 | 1.60 | .84 | 1.52 | 1315 |
| 3000 | 2.28 | .68 | 1.14 | 1760 |
| 4000 | 2.74 | .46 | .80 | 2500 |
| 5000 | 3.08 | .34 | .64 | 3125 |
| 6000 | 3.38 | .30 | .52 | 3850 |
| 7000 | 3.60 | .22 | .38 | 5260 |
| 8000 | 3.76 | .16 | .30 | 6666 |
| 9000 | 3.90 | .14 | .24 | 8350 |
| 10000 | 4.00 | .10 | .20 | 10000 |
| 11000 | 4.10 | .10 | .16 | 12500 |
| 12000 | 4.16 | .06 | .12 | 16000 |
| 13000 | 4.22 | .06 | .12 | 16000 |
| 14000 | 4.28 | .06 | .10 | 20000 |
| 15000 | 4.32 | .04 | .06 | 33300 |
| 16000 | 4.34 | .02 | .06 | 33300 |
| 17000 | 4.38 | .04 | .08 | 25000 |
| 18000 | 4.42 | .04 | .08 | 25000 |
| 19000 | 4.44 | .02 | .06 | 33300 |
| 20000 | 4.48 | .04 | .04 | 33300 |
| 26000 | 4.60 | .02 | .02 | 50000 |

The measurements tabulated on the above chart are plotted in the graph illustrated in FIG. 3 of my U.S. Pat. No. 3,687,478.

A further advantage of the system disclosed herein is that the elastomeric deflection between empty load level and design load level is less in the present system than in the systems disclosed in my prior patents. Tests conducted on the two systems indicated that the sprung mass deflection between empty and load levels in my newer systems has been 1.2 inches compared with 1.48 inches in my prior system. Minimum spring mass deflection between empty and design load levels is important to insure that the vertical position of the vehicle does not change substantially during loading and unloading.

The vehicle suspension systems described in certain embodiments of my invention include means to prevent the cup shaped seats from rebounding away from the elastomeric members. This is accomplished by disposing a compression resistant bumper externally of each of the cup shaped seats. The bumpers are supported against the cup shaped discs by a longitudinal pilot member which extends through bumpers and cup shaped discs and through the elastomeric members and spacers intermediate the bumpers and discs. Other embodiments to be described below need no rebound means at all.

It is accordingly a primary object of this invention to provide a vehicle suspension system having a progressively increasing resistance to deflection for a progressively increasing load.

It is a further object of this invention to provide a vehicle suspension system in which the spring rate varies over a greater range than in systems heretofore available.

It is a further object of this invention to provide a vehicle suspension system in which the spring rate increases from a lower magnitude at empty load levels to a greater magnitude at bump load levels than in systems heretofore available.

It is a further object of this invention to provide a vehicle suspension system which provides a low frequency deflection ride at empty load level and at design load level while providing a relatively higher rate at bump load level conditions.

It is a further object of this invention to provide a vehicle suspension system in which less elastomeric material is used to provide a progressively increasing spring rate than in systems heretofore available.

It is a further object of this invention to provide a vehicle suspension system having a progressively increasing spring rate in which the difference in spring mass deflection between empty and design load levels is less than in systems heretofore available.

Another object of this invention is to provide a vehicle suspension system having a spring rate which progressively exceeds the load increase on the suspension.

Another object of this invention is to provide a vehicle suspension system having an elastomeric assembly composed of a plurality of spherical elastomeric members separated by spherically cupped saucers wherein the elastomeric members are compressed along a horizontal axis as the suspension system proceeds from a no load condition to a bump load condition.

Another object of this invention is to provide a vehicle suspension system composed of one or a plurality of spherical elastomers separated by spherically cupped spacers wherein the elastomeric members may be held captive during rebound from deflection.

A principal object of this invention is to provide an elastomerically damped resilient load-equalizing support means, reactive on opposing axles of a multiple axle vehicle suspension, whereby equalization of loads between axles are cushionedly preserved by the same means which deflectively isolate the excitations of each axle from an opposing axle as well as from the sprung mass.

Another object of this invention is to provide a multiple axle suspension structure as above, attachable externally of a vehicle frame or subframe, which further provides transverse support for the frame.

Still another object is to provide a suspension structure which exhibits relatively low frequency for an unladen vehicle, while also providing progressive resistance against transverse roll of the vehicle when loaded.

A further object of this invention is to provide consistently uniform equalization of load among the respective wheels of the suspension.

Yet another object is to provide a suspension which eliminates wheel hop thereby reducing the necessary stopping distance of a vehicle upon brake application. Vertical brake torque reactions in the vehicle frame structure are avoided.

Another object of the present invention is to isolate the excitations of one axle from its counterpart for the prevention of resonance in semirigid sprung-mass structures.

A yet further object is to provide reactive resistance to suspension deflection so as to reduce by one-half the amplitude of reflection of the sprung mass, and to enable a lower spring rate per axle for any given natural frequency of a suspension.

A still further object is to provide an elastomerically damped compression-resistant isolator for use with either a single or multiple axle vehicle suspension structure.

Yet another object of the present invention is to provide a suspension structure wherein there is a relative vertical disposition of the hinge location of an articulated suspension beam, a suspension spring, and axle centers in order to provide inherent self-steering control of the bogie to a changing path of vehicle movement. Operational advantages include a reduced turning radius of the vehicle with less tire scuffing and less tractive resistance.

Yet another object of the present invention is to provide a joint structure interconnecting the axle hanger brackets and the resilient load equalizers, whereby increased isolation is provided by increasing the wall thickness of the bearing liner and where the liner sleeve or well as the hanger bore are interconnected by an expanded core which also clamps the hanger flanges axially against the sleeve ends of a removable liner bearing collar having a bore tolerance of standard D.O.M. tubing, and assembled without press fit.

The present invention fulfills the forementioned objects and overcomes limitations and disadvantages of prior art solutions to the aforementioned problems as follows:

In one embodiment of the present invention an elastomerically damped compression-resistant isolator is provided for use with a multiple axle vehicle suspension structure. A vehicle frame structure including axles journaled in axle housings have secured thereto transversely spaced load support brackets extending intermediate the axles. Means for isolating excitations of each of said axles from the sprung mass of the vehicle and from each other include a composite deformable spring assembly. This assembly includes a pair of opposed parallel end plates extending at right angles with respect to a longitudinal axis of the assembly. Cup shaped members each defining a receptacle portion having an open end are disposed adjacent each of the end plates such that the respective open ends of the receptacle portions face one another.

A hole is formed through the bottom of each cup shaped member such that a pin integral with each of the end plates extends therethrough. A double cup shaped assembly is disposed coaxially intermediate the aforementioned cup shaped members and end plates in integral back-to-back relationship such that each of two receptacle open ends, facing opposite directions, each face a respective open end of the receptacle portions of the cup shaped members adjacent the end plates. A pin extends coaxially through the double cup shaped assembly such that the extremities thereof extend beyond both of the opposed openings.

A spherical mass of elastomeric material is formed with cavities extending axially therethrough, each length extending between and into the two resulting pairs of receptacles facing one another such that the pins engage portions of the respective cavities in the elastomer.

In one preferred form of the invention the vertically extending arms of opposing rocker beams terminate in spherically concave seats which are arcuately engaged by interconnecting load equalizing support means. An initially low spring rate is afforded the unloaded vehicle, while a progressively increased spring rate is exhibited as increased loads are applied to an elastomeric member having a varying cross section.

In another preferred form of the invention, a single axle suspension structure comprises a beam trunnioned at one end and secured to an axle of its opposite end, with a spherical compression resistant elastomer therebetween. The elastomer is seated in a cupped spring seat attached to the beam, and is resisted in a similar spring seat on which the vehicle frame is supported. In this embodiment of the invention the trunnion is bracketed at a corner of the vehicle frame, if a steering axle is mounted thereunder, whereat said trunnion is of adequate capacity to withstand the spring load reaction, plus brake torque and steering loads. The trunnion may be mounted at the vertical center of a steered wheel spindle, with a steering rod centered at the trunnion vertical center connecting the steering knuckle to avoid steering interference with a rebound deflection. A progressively increasing spring rate, combined with a higher deflection than is feasible with conventional leaf spring suspension affords a ready improvement in cab ride and reduced maintenance of chassis.

The invention will be more clearly understood from the following description of specific embodiments of the invention together with the accompanying drawings, wherein similar reference characters denote similar elements throughout the several views, and in which.

Figure 1:
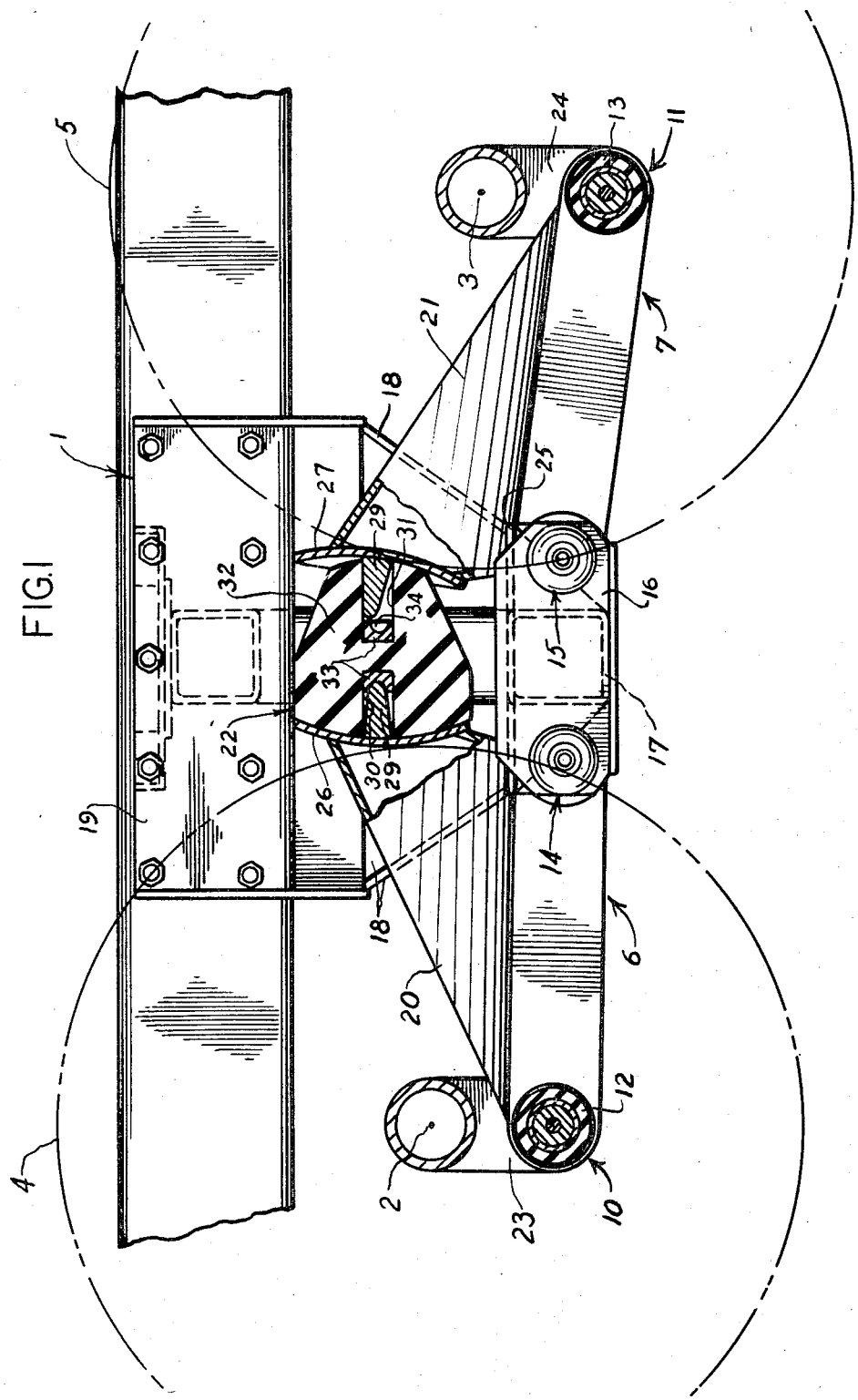
FIG. 1 is a fragmentary sectional elevational view of an embodiment of my invention.

Before referring in detail to the various drawings, together with the reference characters which identify the various elements of these drawings, it is worthwhile here to once again characterize my invention by referring to the characteristics exhibited by the structure herein disclosed.

A vehicle suspension system is described below which isolates the excitations produced or induced within each axle of the vehicle from its opposing axle as well as from the sprung mass, thereby preventing resonance and the undesirable and prevalent villain commonly known as "wheel hop." Articulated load equalizing rocker beams are separately trunnioned in this suspension structure and are outwardly supported by the vehicle axles, thereby providing a resilient load equalization in conjunction with a reactive spring rate per axle of but one-half that of the pair of axles, and employing spherically surfaced, pressure resistant, elastomeric spring means which, in turn, provide a suspension spring rate in pounds of sprung mass per inch of suspension deflection varying from less than the unladen sprung mass to more than the loaded sprung mass. Thus, a softer ride is produced than otherwise feasible without load controlled air systems, while also preventing transverse roll of high load-centered vehicle upon change in its directional path.

This invention specifically encompasses an enlarged field for the application of elastomeric materials of given physical characteristics to a wide range of load-deflection ratios, particularly through the use of multiples of elastomers, with or without spaces therebetween when used in series, to obtain both pressure area and a total deflection which exceed the established life-cycle percentage of the free diameter of each sphere. Where an elastomeric material has the requisite physical properties that a single sphere may provide, both for the desired resistance and deflection for a given wheel load and stroke, then a pair of hemispheres with their flat surfaces secured to rocker beam spring seats and their rounded or convex surfaces abutting one another may serve the user as well as a single sphere of the same size and physical properties. In this way, the requirement of pilots or locating members is virtually eliminated.

In cases where the area of the flat surfaces of such hemispheres, which are in contact with the seat, represents a large percentage of the normal free diameter of the sphere or hemisphere, then the elastomer will be stressed in partial shear with increasing load. This will occur due to the imbalance of vertical heights of the opposing axles, due to the separate trunnions about which each rocker beam seat moves in a separate arcuate path. The longitudinal distance between rocker beam trunnions in the suspension structure of my invention is reduced to a minimum in order to lessen abrasion at the abutting faces of the hemisphere, thereby also reducing shear forces. It should be noted here that while available axial clearance in this particular structure precludes the use of a common trunnion for opposing rocker beams, other structures may well employ same.

A novel feature of my invention resides in the fact that my structure contemplates the use of rocker beams having vertical and horizontal components or arms which will vary in relatively different embodiments such that different ratios of vertical to horizontal components or distances may be preselected and predetermined, where desired. It will now be obvious to the reader that greater vertical component lengths, with the same horizontal component lengths, will yield greater vertical/horizontal ratio magnitudes which will have the result of increasing the deflection of the elastomeric material or member disposed between the upper extremities or upper ends of the vertical components of each rocker beam. In this way, the user, by designing a preselected and predetermined ratio of vertical to horizontal components will be able to obtain preselected deflections of the elastomeric member with given wheel and axle deflections under load.

The following chart or tabulation illustrates the range of practical applications of a compounded elastomeric material having a normal design load or pressure resistance. of psi in a working load deflection of 30 percent of the free diameter of the sphere;- as applied to a suspension structure or system wherein the wheel stroke is 3 inches at each arm end, for a sprung wheel load of 7,500 pounds, with specific reference to a 32,000 pound tandem bogie:

disengagement thereof upon a wheel stroke beyond free position of either axle 3 × 2-½ inches = 7-½ inches, with the opposing pilot fully within the elastomeric member or members.

In cases where the space permits, a predetermined size of an elastomeric sphere may be used and a maximum ratio of horizontal or longitudinal to vertical lengths of rocker beam arms reduces the dependence upon rebound means to hold the elastomeric sphere captive within the confines of the opposing rocker beam seats. In another embodiment of my invention, a pilot may consist of an integrally molded tail protruding axially from the normal spherical contour of the elastomeric member, with said integral pilot extending through an orifice or depression within the rocker beam seat, thereby preventing disengagement of the elastomeric member at a rebound.

Another novel feature of this invention, as described with reference numerals below, exists in a light weight suspension structure achieved by support of cantilevered ends of separately trunnioned, closely spaced rocker beam shafts of hollow configuration, which extend through a simple bracket to a bottom bolster. The bracket serves to position the rocker beams axially on trunnion liners. Each trunnion tube must resist the cou-

TABLE C

| Rocker beam ratio | 1/1 | 1/1.5 | ½ | ⅓ |
|---|---|---|---|---|
| Longitudinal component | 24 inches | 24" | 24" | 24" |
| Vertical component | 24 inches | 16" | 12" | 8" |
| Required force (pounds) | 7500 | 11,250 | 15,000 | 22,500 |
| Sphere area (inches squared) | 13.66 | 20.45 | 27.3 | 41 |
| Sphere free diameter | 4.46 | 5.12 | 5.9 | 7.24 |
| Sphere volume | 45.6 | 70.4 | 107.55 | 200 |
| Number spheres in series | 5 | 3 | 2 | 1 |
| Total sphere volume | 228 | 211 | 215 | 200 |
| Total deflection required | 6 | 4 | 3 | 2 |
| Deflection per sphere | 1.2" | 1.33" | 1.5" | 2" |
| Deflection (percentage free diameter) | 27% | 26% | 27.6% | 27.6% |
| Spacers (where used) | 4 | 2 | 1 | none |

In the suspension structures disclosed herein, the resistance of the elastomeric material used is reactive on both vehicle axles of my structure, amounting to the sprung load at each axle end, multiplied by the ratio of longitudinal (horizontal) to vertical lengths of the rocker beam arms. The required deflection at such load, in order to afford the desired frequency or softness of ride, equals the wheel stroke [or difference between free (or completely unladen) — vs. design load] in inches, multiplied by two (axles), and then divided by the above ratio of longitudinal to vertical lengths of rocker beam arms.

In practice, the working deflection is sometimes restricted to 30 percent of the free diameter of the spherical elastomer, although the diametric area at design load will increase beyond the free diameter as the relative hardness of the elastomer decreases.

The reader will note from the above Table C, wherein rocker beam arm ratios are designated, that with a 3 to 1 longitudinal to vertical arm ratio, the elastomer deflection for a 3 inch wheel stroke is equal to 3 inches × 2 axles × ⅓ = 2 inches deflection; while the free diameter of a sphere having a resistance of 550 psi at design load equals 7.3 inches less 2 inches deflection = 5.3 inches at design load, and roughly 5 inches length at bump. This 5 inches length is available for a pilot member, preferably not more than 2-½ inches in length, secured to each rocker beam seat to prevent ple force of jackknifing, especially in instances where a trailer utilizing the present invention may be turned at 90°, as opposed to a 45° maximum truck steering angle. One advantage of closely positioned trunnions is the fact that centrally disposed supports between the trunnions are not needed.

Tubular trunnions are provided which are of a relatively large diameter and which project through walls of a hollow pedestal to which they are welded. The pedestal rests upon and is welded to the top of a cross bolster extending tarnsversely with respect to the longitudinal axis of the suspension structure to the outer ends of the trunnion tubes, where a removable bracket interconnects the bolster and a head welded into the end of each trunnion tube. Removable elastomeric liners, each one half the length of the trunnion, are retained with an integral flange by said removable bracket which ties the trunnion tubes at their outer ends to the bolster which, in turn, with the trunnion tubes, provides the combined resistance to the otherwise cantilevered trunnions anchored inboard to said pedestal. Unlimited clearance for interconnection of a prop shaft for drive axles is facilitated by discontinuous shapes.

Yet another object of this invention, which will become apparent, is an increased isolation at both the axle collar and at the trunnion collar of each rocker beam. This is accomplished (1) without disturbing interchangeability with the commonly-used "silentbloc"-type hanger bearing and (2) with a reduction in cost by using standard D.O.M. sized tubing for the collars, without the need for presently existing precision machining for pressed fits in both trunnion and axle collars. In my case, the trunnion collar is provided with molded elastomeric liners, split midlength and formed with an integral end flange on each piece which is first inserted in the trunnion collar with the liners flanged to locate the rocker beam on the trunnion tube over which it is forced.

Referring now in more detail to the drawings, FIG. 1 illustrates an assembly 1 employing a structure in association with a truck frame. The suspension system includes a pair of axles having centers 2 and 3, respectively, defined by the center lines shown in FIG. 1, said axles being longitudinally spaced along the vehilce with supporting wheels 4 and 5 respectively. Wheels 4 and 5 are shown in phantom outline.

Beams 6 and 7 of rocker beam assemblies 8 and 9 are trunnioned in bushing assemblies 10 and 11. It is within the scope of invention for bushing assemblies 10 and 11 to be carried by beam hanger brackets or other suitable support means. Bushing assemblies 10 and 11 are lined with bushings 12 and 13, which, in turn, are deflectable radially, torsionally and axially. Opposite ends of beams 6 and 7 are trunnioned in bushing assemblies 14 and 15, which are connected to and support the sprung load at flanges 16 located at the ends of transversely extending horizontal tube 17, tube 17 transmitting the load upwardly through brackets 18 on transversely opposite sides of the structure and thence through flanged supports 19 to opposite sides of the vehicle frame. It is further within the scope of this invention to include gussets and stiffening members such that brackets 18 are transversely supported and reinforced.

Each of beams 6 and 7 is integral with an upstanding steel member 20 and 21, each of which extends to a load equalizing assembly 22. Steel members 20 and 21 are secured, such as by welding, to beams 6 and 7. It is to be noted that the entire suspension structure is constructed basically of light gauge, high-tensile strength steel to enable a minimum of tare weight, even where top torque rods are included to preclude the possibility of wheel hop, regardless of road surface or braking conditions. The isolation of the excitations of each axle from the opposite axle and from the sprung mass, without external forces or controls, is unequalled by existing structures. All hinge centers are closely machined and rubber bushed so as to do away with adjustment requirements. In the embodiment of the invention shown in FIG. 1, for example, bushing assemblies are carried by beam hanger brackets 23 and 24, each of which is welded to the lowermost side of the axle housings associated with axles 2 and 3. A suspension bolster 25 associated with flange 16 provides the support to which forces from beams 6 and 7 are conveyed via bushing assemblies 14 and 15.

Cup-shaped members 26 and 27 are secured, such as by welding, to the inner and uppermost portions of members 20 and 21 of rocker beam assemblies 8 and 9, respectively. Cup-shaped members 26 and 27 are situated such that their concave surfaces face one another, each of these surfaces providing the supporting surface for tapered, inwardly extending pilot members 28 and 29, respectively. Pilot members 28 and 29 extend into cavities 30 and 31 formed within a double-tapered elastomeric member 32 located between cup-shaped members 26 and 27. Member 32 includes a maximum diameter midlength portion, away from which tapered portions extend toward the cup shaped members. In a preferred embodiment of the invention, the convex ends of the tapered elastomeric member terminate in a generally spherical surface.

A bumper member 33 is disposed within the innermost portions of each of cavities 30 and 31, this bumper member being formed with a receiving cavity 34 adapted to be penetrated by the tapered end of the pilot member already described.

For purposes of illustration, FIG. 1 shows vehicle wheel 4 in a position which it would reach if deflected as a result of a road bump or discontinuity, while wheel 5 is shown in an unloaded or unexcited condition. It should be obvious that upon wheel 4 encountering the aforementioned discontinuity, the entire wheel is lifted with the result that rocker beam assembly 8 pivots arcuately such that cup shaped member 26 engages the spherical end of the tapered portion of elastomeric member 32 initially adjacent its concave surface. As the rocker beam pivots, the elastomeric member is further arcuately compressed, exhibiting a progressively increasing rate or constant commonly defined in terms of its deflective resistance to force. The extreme loaded position is reached after pilot member 28 engages cavity 34 of opposing bumper 33, then positively subjecting that portion of elastomer 32 between the adjacent opposing faces of bumper 33 to direct pressure, rather than from the deformative movement within the elastomer resulting from contact on elastomer 32 being squeezed between the opposing seats 26 and 27. Further resistance to deflection is provided by the entire cross-sectional diameter of the maximum-diameter midlength area of elastomeric member 32. Thus, we see that dampening is achieved in this invention by providing means, including the above structure, in which a progressively increasing spring rate is achieved.

Isolation of excitations of opposing axles is achieved via compression of an equalizer. Contact between the rocker beam assemblies and the equalizer through engagement of the cup-shaped members 26 and 27 is arcuate with a high initial deflection or low spring rate being exhibited by the equalizer. The pilot members serve the dual purpose of both supporting elastomeric member 32 within cavities 30 and 31, as well as transmitting forces from the rocker beam to the equalizer upon engagement with the bumper members at load position. Bumper members may be molded within the elastomer or may be assembled by other suitable conventional methods.

Figure 2:
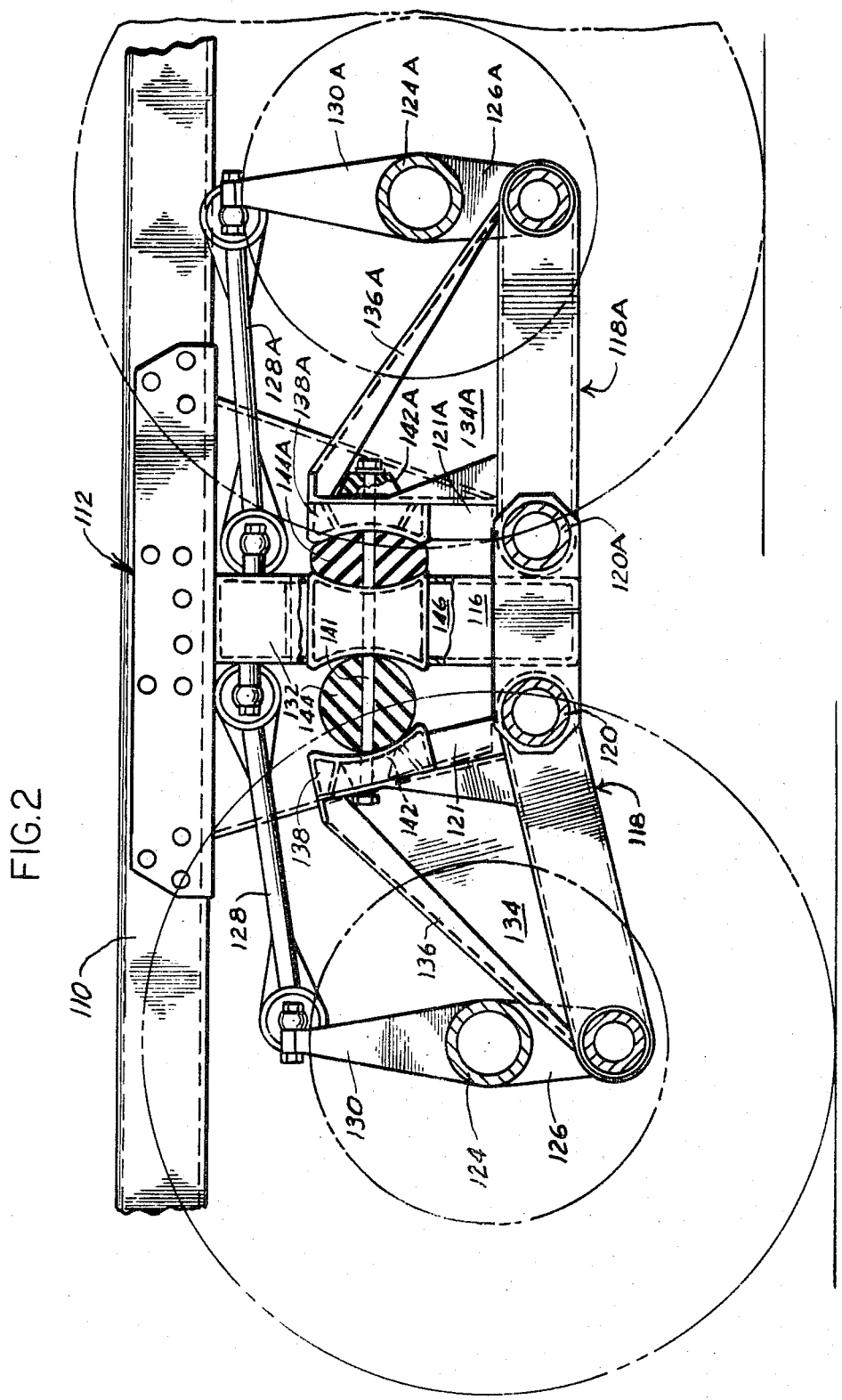
FIG. 2 is a fragmentary sectional elevational view of another embodiment of my invention.

Referring now to FIG. 2, a vehicle frame 110 is supported by a frame bracket 112 having a horizontal portion which is attached to the vehicle frame in a downwardly depending vertical portion. The vehicle frame is supported by a pair of oppositely disposed rocker beams 118 and 118A. The frame bracket 112 is attached to the rocker beams 118 and 118A by trunnions 120 and 120A, respectively. The rocker beams 118 and 118A have vertically extending members 121 and 121A, respectively, and horizontally extending members 122 and 122A, respectively. The ends of the horizontally extending members of the rocker beams opposite the ends which are trunnioned onto the frame bracket are attached to the vehicle axles 124 and 124A, respectively, by any suitable conventional means. In this particular embodiment, the ends of the horizontally extending rocker beam members are trunnioned onto the beam hanger members 126 and 126A, respectively, which are, in turn, integral with axles 124 and 124A, respectively. Torque rods 128 and 128A are attached to the torque pillars 130 and 130A shown in FIG. 2. These torque pillars are also integral with the vehicle axles. The opposite ends of torque rods 128 and 128A are hinged to the frame bracket 112 at the center of the transversely extending portion 132 of the frame bracket.

The rocker beams 118 and 118A have webs 134 and 134A, which are transversely centered in the rocker beams so as to connect the horizontal rocker beam portions 118 and 118A with top chords 136 and 136A shown in this FIG. Top chords 136 and 136A extend downwardly from the top end of the vertically extending portion of the rocker beams to the respective axles, similar to the hypotenuse of a triangle. The chords 136 and 136A have flanges with tapered widths as the chords extend downwardly to the respective axles of the vehicle. The inwardly facing sides of the vertically extending rocker beam members 121 and 121A carry spring seats 138 and 138A which, in turn, are positioned at the top portions of the vertical members. Pilot shaft 140 extends through each of the seats 138 and 138A and through a hole punched in the web members 134 and 134A. The ends of the pilot shaft 140 which protrude through the respective webs 134 and 134A of the rocker beams are secured thereto by nuts or any other suitable or conventional means.

Pilot shaft 140 also extends through bumpers 142 and 142A positioned between the web and the spring seat in each of the rocker beams. The purpose of the compression resistance bumpers is to prevent the rocker beam seats 138 and 138A from rebounding outwardly away from the elastomeric member 144 and 144A after deflection. If the vehicle equipped with my invention encounters a severe bump condition, sufficient to move the wheels of the vehilce off the road, the bumpers would prevent the seats from rebounding outwardly to produce a severe vertical displacement between the frame and the axle. The contact faces of the bumpers 142 and 142A are spherically cupped as are the inwardly facing portions of the spring seats 138 and 138A, so as to provide the spring seats with sufficient workable contact with the spherically-shaped elastomeric members during the arcuate path of travel of the vertically extending rocker beam members during deflection.

In a preferred embodiment of this invention illustrated in FIG. 2, a pair of spherical elastomeric members are supported on pilot shaft 140 between the spherically-cupped spring seats 138 and 138A, which are mounted on the opposing faces of the rocker beam vertical components. These elastomeric members are held captive between the spring seats by virtue of the secured protruding ends of the pilot shaft. A spherically-cupped spacer 146 also supported by the pilot shaft 140 is positioned between the spherical elastomeric members 144 and 144A. The spacer can be made from any compression resistant light material. The pilot shaft 140 extends through the geometric center of the spherical elastomeric members and the spacer 146. In alternate embodiments of the invention not shown but deemed to be within the scope of this invention, a plurality of spherical elastomeric members greater than two can be supported on a pilot shaft between the opposing faces of the rocker beam vertical components with spacers between adjacent elastomeric members.

FIG. 2 illustrates the vehilce suspension system of this invention in a completely free or unladen condition, such as would exist during the assembling of the suspension structure, as well as the design load level. In the free or unladen condition, the rebound bumpers 142 and 142A are compressively engaged by the outwardly facing sides of the spring seats 138 and 138A, respectively. Also, during this unladen condition, the inwardly facing sides of spring seats 138 and 138A are in point contact with their adjacent spherical elastomeric members 144 and 144A. As load is placed on the vehicle frame, the frame 110 is lowered in relation to the axles 124 and 124A and the spring seats 138 and 138A move toward one another in an arcuate path about their trunnioned centers 120 and 120A. Proceeding from the free or no-load position illustrated to the design load level also illustrated, the opposing spring seats 138 and 138A proceed along an arcuate path in engaging the spherical elastomers. Since the elastomers are being compressively deflected to a greater degree as the spring seats progressively move along their arcuate paths, the diametric or cross-sectional area of the spherical elastomers is progressively increased because the spherically-cupped spring seats tend to contain a greater portion of the cross-sectional areas of the elastomers. Simultaneous with the engagement by the spring seats of an increased cross-sectional area of the elastomers in the engagement by the spherically-cupped spacers positioned between the elastomers of more of the cross-sectional area of same. Accordingly, a plurality of spherical elastomers arranged in series with spherically-shaped spacers between adjacent elastomers causes a direct multiplication of the higher deflection of the elastomers at low level loadings, and a progressively increasing resistance to deflection at increasing load levels, during which the area of the elastomers entrapped within the enclosing spring seats and spacers is greater.

As illustrated in FIG. 2, at design load, the central axis of each of the spring seats is coincidental with the longitudinal axis of the pilot shaft, and the central axes of the elastomeric members and the spacers. This results in maximum elastomeric resistance to deflection at design load. A wide range of variations in spring rates of the elastomeric assembly including a plurality of spherical elastomers and spherically-cupped seats and spacers is available by varying the spherical diameter of the elastomers, by varying the axial length of a basically spherical form of elastomer, and by varying the spherical radius of the seats and spacers. The service life of compression resistant elastomeric members is improved because the shape described enables a most uniform distribution of stress therein.

Figure 3:
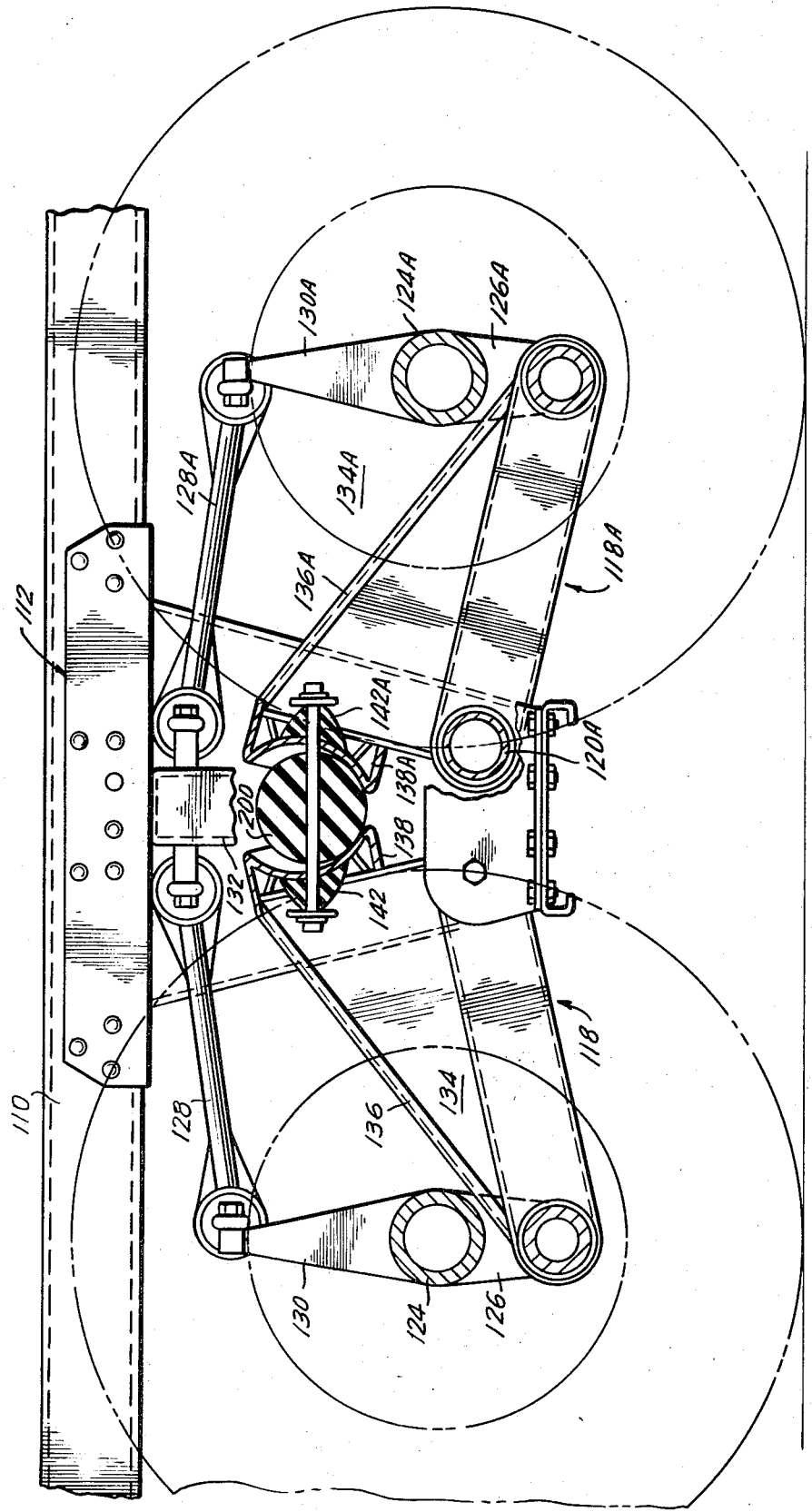
FIG. 3 is a fragmentary sectional elevational view of yet another embodiment of my invention.
Figure 4:
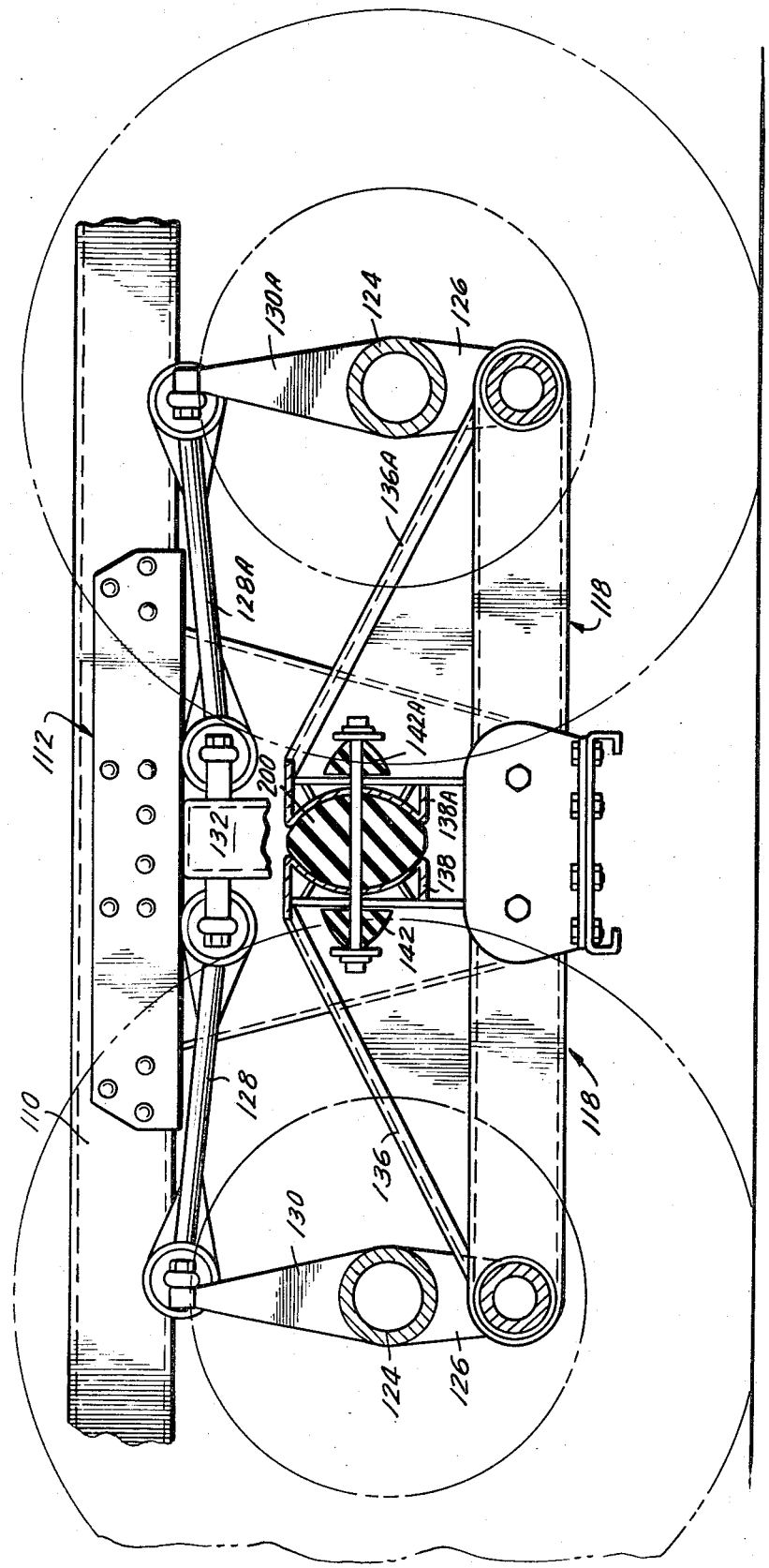
FIG. 4 is a fragmentary sectional elevational view of the embodiment of my invention shown in FIG. 3, but in a loaded state.

Referring now to FIGS. 3 and 4, we see illustrated in these Figs. a structural configuration similar to that already described for and shown in FIG. 2 but including as part of the load equalizing structure of this embodiment of the invention a single elastomeric member 200, which is spherical in shape. For purposes of convenience, the common elements of the structure shown in FIGS. 3 and 4 with those shown and described for FIG. 2 are described with identical reference characters for the ease of the reader. Thus, we see in FIG. 3 that elastomeric member 200 is disposed between spring seats 138 and 138A of the rocker beams.

Note that FIG. 3 depicts the suspension structure in an unladen or unloaded condition, while FIG. 4 illustrates the relative positions of the elements of my invention in the stressed or laden position. Of particular interest is the fact that no spacer members is required due to the fact that the ratio of length of the vertical leg to length of the horizontal leg of the rocker beams 118, 118A is increased to thereby reduce the spring deflection for a given wheel stroke while increasing the spring load, for which the larger diameter of elastomer is required, whereat the reduced deflection is within the safe limits of the large diameter elastomer.

Figure 5:
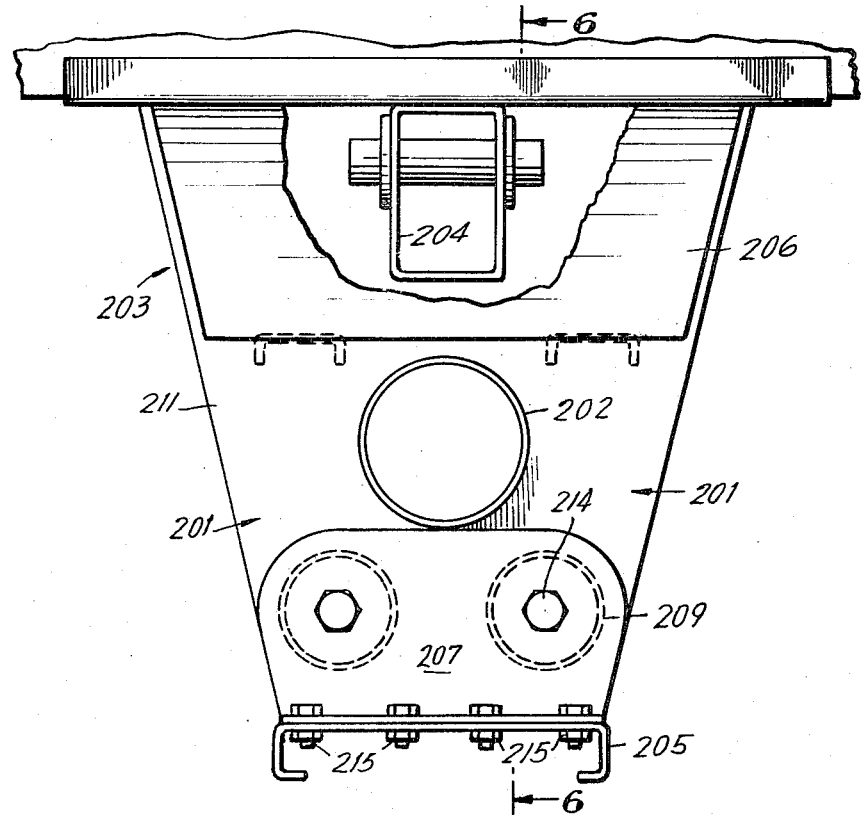
FIG. 5 is a fragmentary elevational view, shown partially cut away, in which an outside mount truck suspension structure is illustrated.
Figure 6:
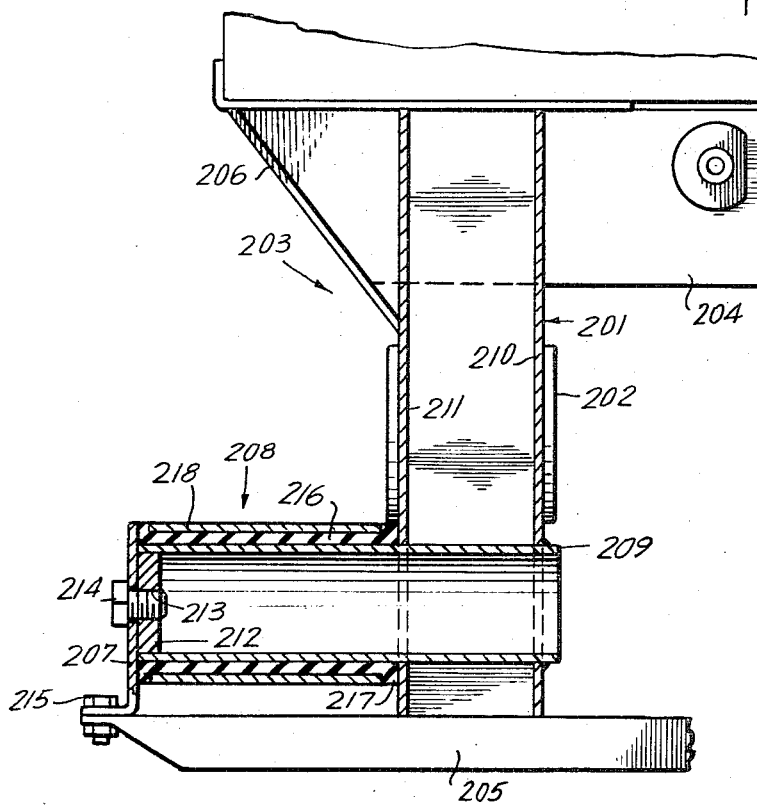
FIG. 6 is a sectional elevational view looking along the line 6 — 6 of FIG. 5.

Of particular interest in the structures illustrated in FIGS. 3 – 8, is the existence of a frame bracket assembly which is quite novel in itself. These brackets or bracket assemblies consist of a hollow pedestal 201 which extends substantially vertically and downwardly from a standard 9-½ inches truck frame to form a basic element of an outside mounting or mount. FIGS. 5 and 6 show with particularity an 8 inches outside diameter tubular stiffener member 202 which extends in a transverse direction with respect to the longitudinal axis of my suspension structure through hollow pedestal 201. At an uppermost portion of this bracket assembly 203, a transversely extending transom member 204 extends in the form of a hollow, 4 inches by 6 inches tubular member. Hollow pedestal 201 extends downwardly to a cross bolster member 205, which exists in the form of a channel member extending transversely across the vehicle. Outside portions of this channel member or bolster member 205 are formed with holes that are punched or drilled therethrough, in the case shown in FIGS. 5 and 6, four holes exist to receive threaded bolts. A stiffener member 206 extends at an angle upwardly and outwardly from hollow pedestal 201 to increase the moment of inertia of this portion of the overall assembly. A removable bracket 207 is shown in FIGS. 5 and 6 as having an angle shape and is formed with openings therethrough. Removable bracket 207 interconnects bolster member 205 with a trunnion assembly 208 on either side of the center line of the assembly 203 shown in FIG. 5. Thus, bracket 207 serves to tie trunnion assemblies 208 (also referred to as trunnion assemblies 120 and 120A for FIGS. 3 and 4, already described above).

Each of these trunnion assemblies consists of a tubular member 209 which extends transversely through bolster member 201 and is welded to walls 210 and 211 of the hollow pedestal member. A plug member 212 or head is welded into the outwardly extending end of tubular member 209 such that a flush configuration is achieved. Plug member 212 is formed with a tapped or threaded opening 213 which receives threaded bolt 214 which, in turn, holds bracket 207 to tubular member 209. A bolt and nut 215 is located through each of the four holes through the bolster member 205 and serves to hold the bolster and removable bracket 207 together.

A removable liner 216 in the form of an elastomeric member and approximately one-half the length of the trunnion and each being formed with an integral flange 217 extend about the outer surfaces of tubular member 209 and yet within outer sleeve 218. Thus, we see in FIG. 6, for example, a trunnion assembly which combines resistance to the otherwise cantilevered trunnions anchored inboard to the pedestal, and discontinuous between pedestals to provide unlimited clearance for interconnecting prop shafts for drive axles.

Figure 7:
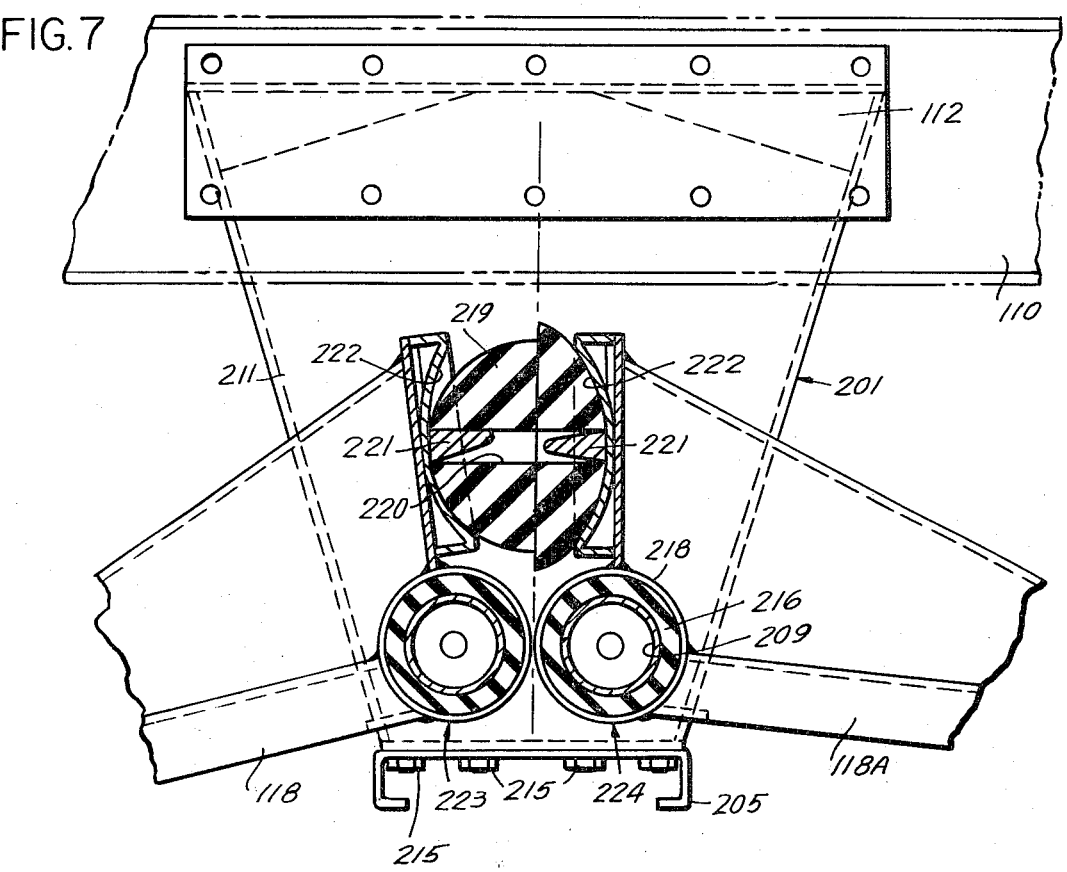
FIG. 7 is a fragmentary sectional elevational view of an alternate embodiment of my invention.
Figure 8:
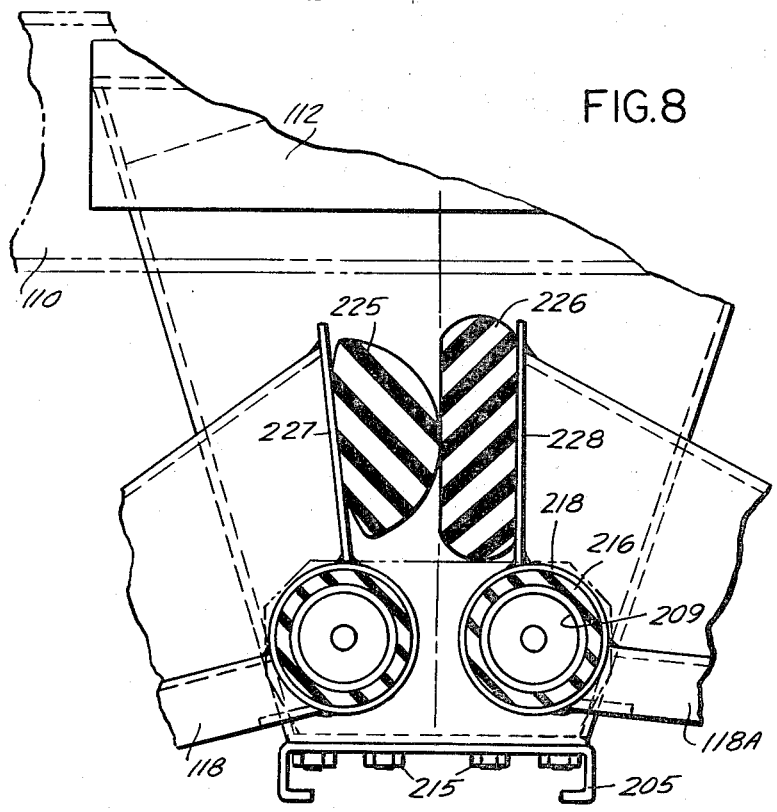
FIG. 8 is yet another fragmentary sectional elevational view of yet another embodiment of my invention.

FIGS. 7 and 8 illustrate yet further embodiments of my invention wherein alternate elastomeric member configurations are available to the user. Utilizing common reference numerals, we see in FIG. 7 a single spherical elastomeric member 219, shown in both the stressed and unladen configurations. Elastomeric member 219, is formed with a hole 220 extending therethrough.

Hole 220 receives pilot member 221 which, in turn, extend from spring seats 222. The reader will note the proximity of trunnion assemblies 223 and 224 with respect to one another, this proximity or juxtaposition reducing the angle of intersection of the respective arcuate paths of the seats. The remaining reference characters of FIG. 7 are common with the Figs. just described above.

FIG. 8, on the other hand, goes one step further to provide hemispherical-shaped elastomeric members 225 and 226 which are secured, such as by bonding, to relatively flat surfaces 227 and 228, respectively. As in the case for FIG. 7, FIG. 8 depicts elastomeric members in hemispherical form in both the unstressed or unladen condition as well as stressed or loaded condition. Note the absence of pilot members and rebound means in the configuration shown in FIG. 8, thereby lending a more efficient, simple and inexpensive structure to the user according to the present invention.

Figure 9:
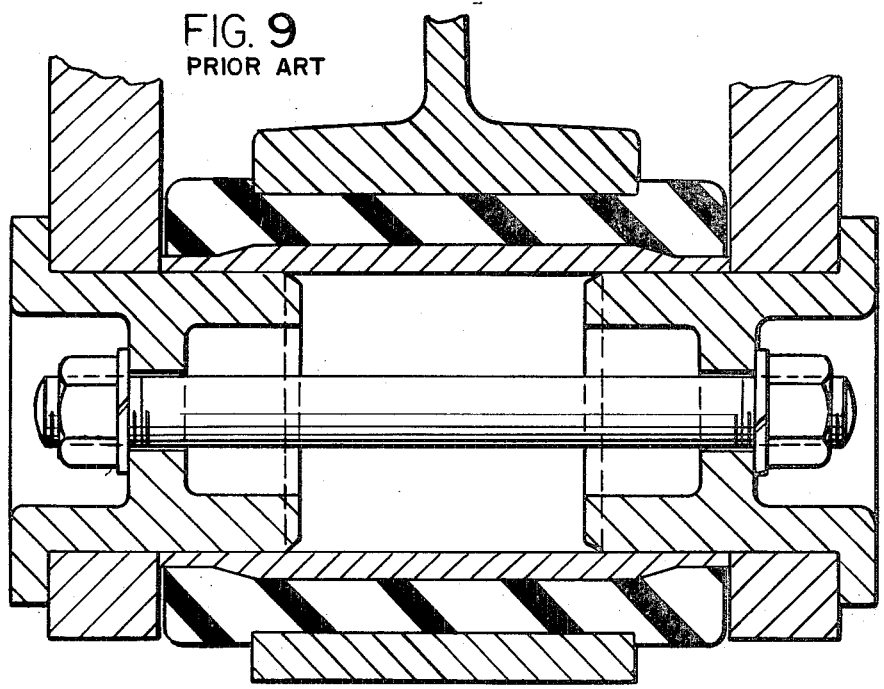
FIG. 9 is a fragmentary sectional elevational view of a prior art embodiment of an axle hanger bearing structure.
Figure 10:
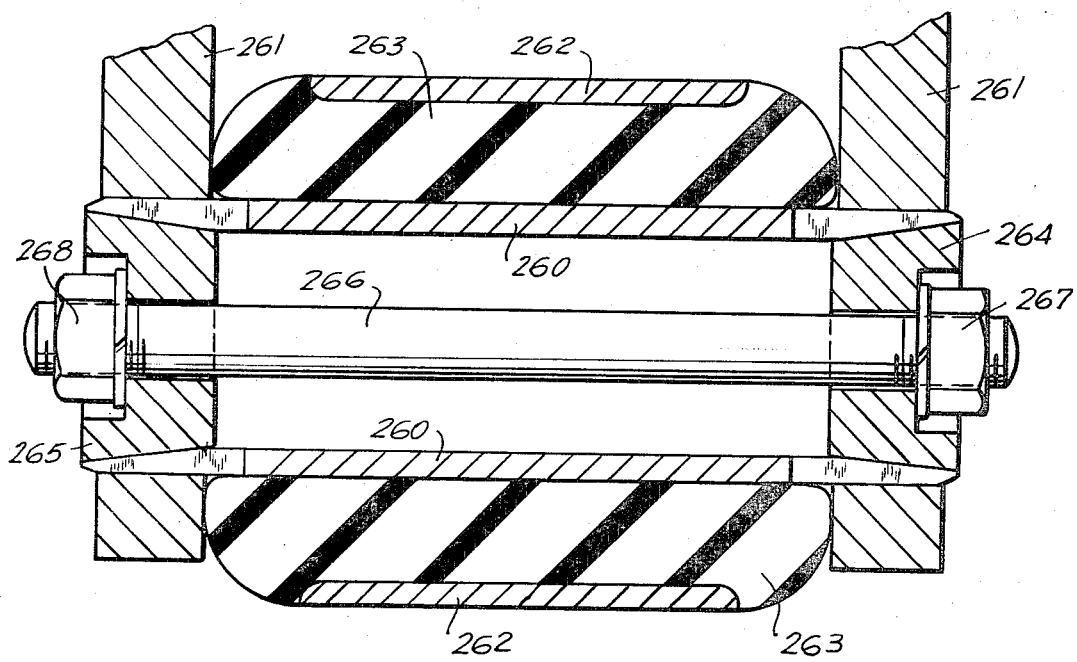
FIGS. 10 and 11 each show a fragmentary sectional elevational view of an embodiment of my invention which incorporates an axle hanger bearing structure.
Figure 11:
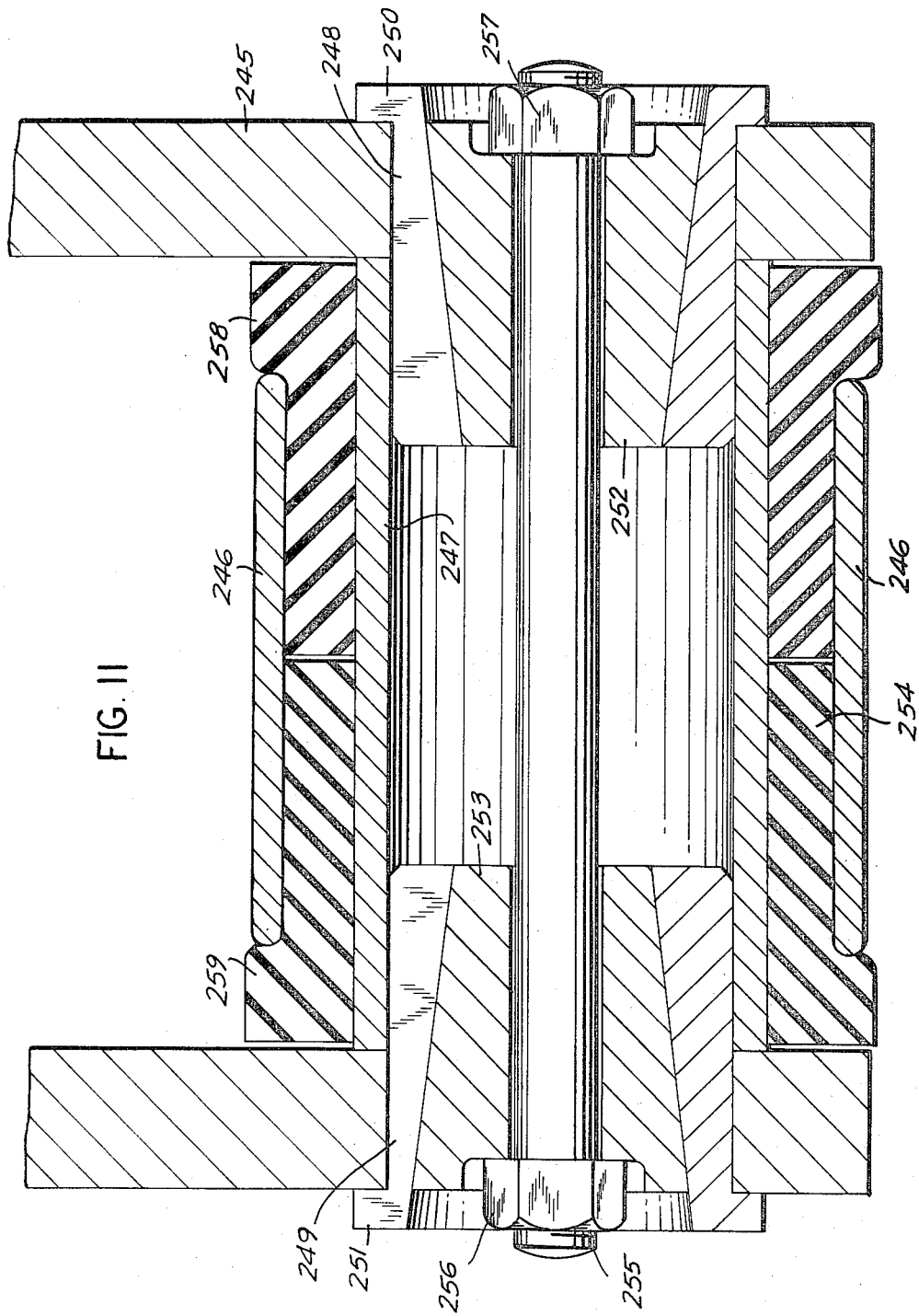

FIGS. 9, 10 and 11 illustrate hanger bracket bearing assemblies. FIG. 9 simply shows the conventional bearing configuration commonly in use and having considerable drawbacks. FIG. 11 illustrates a preferred embodiment of this aspect of my invention wherein the assembly shows two depending hanger bracket flanges 245 within which a collar 246 is disposed. Collar 246 encircles and may be bonded to a flanged liner 254 formed with flanges 258 and 259, respectively, at its endmost portions. Liner 254, in turn, encircles an inner sleeve 247. Coaxially with respect to sleeve 247, two split tube members 248 and 249 extend through holes formed in and through flanges 245 and are each, in turn, formed with inner converging tapered openings within which plug members 252 and 253 are located. The taper of the outer surfaces of plug members 252 and 253 cooperates with the taper of tube members 248 and 249.

A bolt 255 extends through plug members 252 and 253 and is captured at its ends by nuts 256 and 257. Flanges 250 and 251 of tube members 248 and 249 bear against the outer surfaces of flanges 245.

In many instances, the structure shown in FIG. 11 will be preferred over that of FIG. 10 in that, in the latter, a longer bolt and a single tube member is utilized. Split tube member 260 extends through holes formed through flanges 261 of a hanger bracket, with tapered plug members 264 and 265 located within the ends of tube member 260. Nuts 267 and 268 are tightened on bolt 266 (or threaded rod), while a liner 263 and outer collar 262 encircle the tube member coaxially. The aforementioned advantages are realized with the structures shown in FIGS. 10 and 11.

The present invention has been described in sufficient detail to enable one of ordinary skill in the art to make and use same. Obviously, modifications and alterations of the aforedescribed preferred embodiments of my invention will occur to others upon a reading and understanding of the specification and drawings, and it is my intention to include all such modifications and alterations as part of my invention, insofar as they come within the proper scope and spirit of the invention as defined by the appended claims.

What is claimed is:

1. A structure for use with axle suspension system, comprising, in combination: a bracket member formed with bearing surfaces defining substantially axially aligned holes therethrough, said bearing surfaces extending substantially longitudinally with respect to the axis of said holes, a tubular assembly having portions thereof extending through said aligned holes, tapered plug members disposed within end portions of said tubular assembly and each being formed with an opening extending therethrough, and threaded means extending through said openings for moving said plug members toward one another, thereby firmly holding said tubular assembly end portions against said bearing surfaces, said tubular assembly comprises at least one split tube member, a sleeve member disposed in contact with and disposed between said split tube member and an elastomeric member, said elastomeric member encircling portions of said sleeve, and a ring member disposed in contact with and encircling portions of said elastomeric member.

2. The structure according to claim 1, wherein said structure comprises an axle hanger bearing assembly.

3. The structure according to claim 2, wherein said threaded means comprises a bolt and at least one nut.

4. The structure according to claim 3, wherein said bracket member comprises an axle hanger bracket flange.

5. The structure according to claim 4, wherein said elastomeric member includes a tubular elastomer cast with said ring member within outer longitudinally extending surfaces thereof.

6. The structure according to claim 5, wherein said holes, said tube member, said openings, said bolt, said elastomeric member and said ring member are substantially co-axially aligned with one another.

7. The structure according to claim 6, wherein the moving of said plug members toward one another locks said tube member with respect to said axle hanger bracket flange without producing appreciable bonding stresses within said tube member.

8. The structure according to claim 7, wherein inner end surfaces of said tube member are tapered.

9. The structure according to claim 8, wherein said plug members are formed with tapered outer surfaces which cooperatively engage said tapered inner end surfaces such that movement of said plug members toward one another will bias the ends of said tube member outwardly against said bracket member bearing surfaces.

* * * * *